United States Patent
Mishra

(10) Patent No.: US 7,689,085 B1
(45) Date of Patent: Mar. 30, 2010

(54) LARGE EFFECTIVE AREA FIBER WITH GE-FREE CORE

(75) Inventor: Snigdharaj Kumar Mishra, Wilmington, NC (US)

(73) Assignee: Corning Incorporated, Corning, NY (US)

(*) Notice: Subject to any disclaimer, the term of this patent is extended or adjusted under 35 U.S.C. 154(b) by 141 days.

(21) Appl. No.: 12/362,694

(22) Filed: Jan. 30, 2009

(51) Int. Cl.
*G02B 6/02* (2006.01)
*G02B 6/36* (2006.01)

(52) U.S. Cl. ......................... 385/127; 385/123; 385/124

(58) Field of Classification Search .......... 385/123–127
See application file for complete search history.

(56) References Cited

U.S. PATENT DOCUMENTS

| | | | | |
|---|---|---|---|---|
| 4,082,420 | A | 4/1978 | Shiraishi et al. | 350/96.31 |
| 4,690,504 | A | 9/1987 | Yokokawa et al. | 350/96.34 |
| 4,735,475 | A | 4/1988 | Watanabe et al. | 350/96.34 |
| 4,802,733 | A | 2/1989 | Bachmann et al. | 350/96.34 |
| 4,838,643 | A | 6/1989 | Hodges et al. | 350/96.33 |
| 5,146,534 | A | 9/1992 | Liines | 385/142 |
| 5,335,306 | A | 8/1994 | Takita et al. | 385/142 |
| 6,153,546 | A | 11/2000 | Saitoh et al. | 501/37 |
| 6,289,161 | B1 | 9/2001 | Schotz et al. | 385/142 |
| 6,449,415 | B1 | 9/2002 | Sasaoka | 385/123 |
| 6,754,423 | B2 | 6/2004 | Simons et al. | 385/126 |
| 7,082,243 | B2 * | 7/2006 | Bickham et al. | 385/127 |
| 7,164,835 | B2 * | 1/2007 | Matsuo et al. | 385/127 |
| 7,426,327 | B2 * | 9/2008 | Mishra | 385/123 |
| 7,450,807 | B2 * | 11/2008 | Bickham et al. | 385/126 |
| 7,454,109 | B2 * | 11/2008 | Park et al. | 385/127 |
| 2003/0063880 | A1 | 4/2003 | Koumura et al. | 385/127 |
| 2004/0200240 | A1 | 10/2004 | Abe et al. | 65/397 |

OTHER PUBLICATIONS

Single-Mode Fiber Optics: Principles and Applications; Second Edition, Revised and Expanded; Luc B. Jeunhomme; pp. 39-44.

* cited by examiner

*Primary Examiner*—Kevin S Wood
(74) *Attorney, Agent, or Firm*—Svetlana Z. Short

(57) ABSTRACT

An optical waveguide fiber comprising:

(i) a Ge free core having an effective area of 90 $\mu m^2$ to 160 $\mu m^2$, at a 1550 nm wavelength, and α value $12 \leq \alpha \leq 25$, said core comprising:

(a) a central core region extending radially outwardly from a centerline to a radius $r_0 \leq 2$ μm, and having a relative refractive index percent profile $\Delta_0(r)$ wherein $-0.1\% \leq \Delta_0(r) \leq 0.1\%$, and wherein the central core region has a maximum relative refractive index, $\Delta_{0MAX}$;

(b) a first annular core region surrounding and directly adjacent to the central core region and extending to an outer radius $r_1$, wherein 4.8 μm $\leq r_1 \leq 10$ μm, and having a relative refractive index percent profile, $\Delta_1(r)$, and a minimum relative refractive index, $\Delta_{2MIN}$, and the relative refractive index measured at a radius r=2.5 μm being $-0.15 \leq \Delta_1(r=2.5$ μm$) \leq 0$, and $\Delta_{0MAX} \geq \Delta_1(r=2.5$ μm$)$;

(c) a fluorine doped second annular region surrounding and directly adjacent to the first annular core region and extending to a radius 13 μm $\leq r_2 \leq 30$ μm and having a negative relative refractive index percent profile, $\Delta_2(r)$, with a minimum relative refractive index $\Delta_{2MIN}$ being:

$$\Delta_{2MIN} < \Delta_1(r=2.5 \text{ μm}), \text{ and } -0.7\% \leq \Delta_{2MIN} \leq -0.28\%;$$
and (ii) a cladding surrounding the core and having a relative refractive index percent $\Delta_c(r)$ in % measured relative to pure silica, and $\Delta_c(r) = \Delta_{2MIN} \pm 0.3\%$;

wherein the relative refractive index profile of the optical fiber is selected to provide attenuation of no more than 0.175 dB/km at the wavelength of 1550 nm.

14 Claims, 7 Drawing Sheets

US 7,689,085 B1

LARGE EFFECTIVE AREA FIBER WITH GE-FREE CORE

BACKGROUND

1. Field of the Invention

The present invention relates generally to optical fibers, and particularly to large effective area optical fibers with pure silica core and low attenuation.

2 Technical Background

Optical amplifier technology and wavelength division multiplexing techniques are typically required in telecommunication systems that provide high power transmissions for long distances. The definition of high power and long distances is meaningful only in the context of a particular telecommunication system wherein a bit rate, a bit error rate, a multiplexing scheme, and perhaps optical amplifiers are specified. There are additional factors, known to those skilled in the art, which have impacted upon the definition of high power and long distance. However, for most purposes, high power is an optical power greater than about 10 mW. High power systems often suffer from non-linear optical effects, including self-phase modulation, four-wave-mixing, cross-phase modulation, and non-linear scattering processes, all of which can cause degradation of signals in high powered systems. In some applications, single power levels of 1 mW or less are still sensitive to non-linear effects, so non-linear effects may still be an important consideration in such lower power systems. In addition, other optical fiber attributes, such as attenuation, are a major contributing factor to the degradation of the signal.

Generally, an optical waveguide fiber having a large effective area ($A_{eff}$) reduces non-linear optical effects, including self-phase modulation, four-wave-mixing, cross-phase modulation, and non-linear scattering processes, all of which can cause degradation of signals in high powered systems.

On the other hand, an increase in effective area of an optical waveguide fiber typically results in an increase in macrobending induced losses which attenuate signal transmission through a fiber. The macrobending losses become increasingly significant over long (e.g., 100 km, or more) distances (or spacing between regenerators, amplifiers, transmitters and/or receivers. Unfortunately, the larger the effective area of a conventional optical fiber is, the higher the macrobend induced losses tend to be. Further more, attenuation can be a major contributing factor to the degradation of the signal in large effective area fibers.

SUMMARY

One embodiment of the invention is an optical waveguide fiber comprising:

(i) a Ge free core having an effective area of about 90 μm² to about 160 μm² at the 1550 nm wavelength, and α value $12 \leq \alpha \leq 25$, said core comprising:

(a) a central core region extending radially outwardly from a centerline to a radius $r_0 \leq 2$ μm, and having a relative refractive index percent profile $\Delta_0(r)$, wherein $-0.1\% \leq \Delta_0(r) \leq 0.1$, and wherein the central core region has a maximum relative refractive index, $\Delta_{0MAX}$;

(b) a first annular core region surrounding and directly adjacent to the central core region and extending to an outer radius $r_1$, wherein 4.8 μm $\leq r_1 \leq 10$ μm, and having a relative refractive index percent profile, $\Delta_i(r)$, a minimum relative refractive index, $\Delta_{2MIN}$, and the relative refractive index measured at a radius r=2.5 μm being:

$-0.15 \leq \Delta_i(r=2.5$ μm$) \leq 0$ and $\Delta_{0MAX} \geq \Delta_1(r=2.5$ μm$)$;

(c) a fluorine doped second annular region surrounding and directly adjacent to the first annular core region and extending to a radius $r_2$, wherein 13 μm $\leq r_2 \leq 30$ μm and having a negative relative refractive index percent profile, $\Delta_2(r)$, with a minimum relative refractive index $\Delta_{2MIN}$ being:

$\Delta_{2MIN} \leq \Delta_1(r=2.5$ μm$)$ and $-0.7\% \leq \Delta_{2MIN} \leq -0.28\%$;

(ii) a cladding surrounding the core and having a relative refractive index percent $\Delta_c(r)$, and $\Delta_c(r) = \Delta_{2MIN} \pm 0.3\%$; wherein the relative refractive index profile of the optical fiber is selected to provide attenuation less than 0.175 dB/km at the 1550 nm wavelength.

According to some exemplary embodiments, at least a portion of the central core region is made of pure silica.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION

Definitions

Figure 1A:
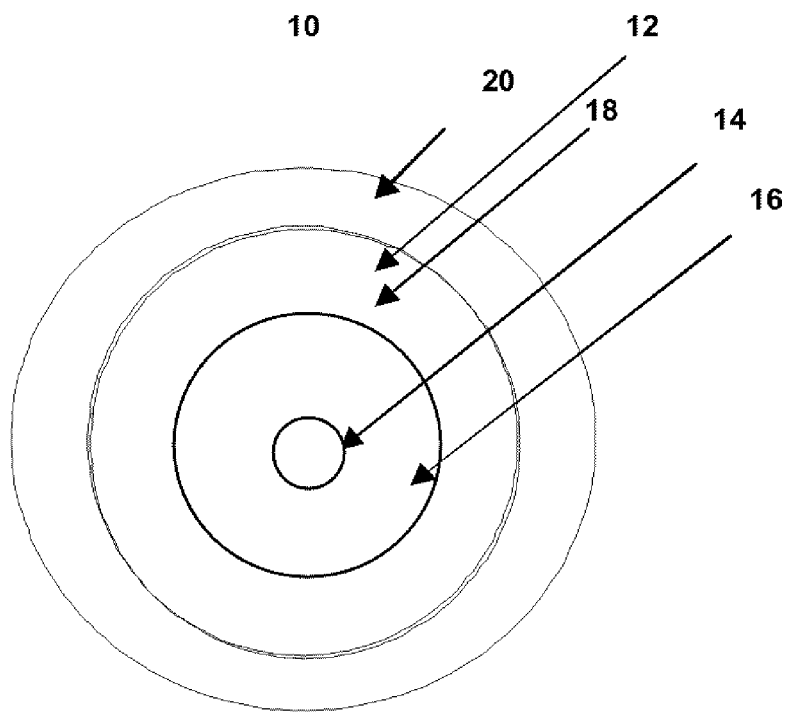
FIG. 1A is a cross-sectional view of one embodiment of the present invention.

The "refractive index profile" is the relationship between refractive index or relative refractive index and waveguide fiber radius.

The "relative refractive index percent" is defined as $\Delta\% = 100 \times (n(r)^2 - n_s^2)/2n(r)^2$, where n(r) refractive index at the radial distance r from the fiber's centerline, unless otherwise specified, and $n_s$ is the refractive index of pure silica glass. As used herein, the relative refractive index is represented by Δ and its values are given in units of "%", unless otherwise specified. In cases where the refractive index of a region is less than that of silica, the relative index percent is negative and is referred to as having a depressed index, and is calculated at the point at which the relative index is most negative unless otherwise specified. In cases where the refractive index of a region is greater than the refractive index silica, the relative index percent is positive and the region can be said to be raised or to have a positive index, and is calculated at the point at which the relative index is most positive, unless otherwise specified. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Dispersion values in a two-moded regime assume intermodal dispersion is zero. The zero dispersion wavelength ($\lambda_0$) is the wavelength at which the dispersion has a value of zero. Dispersion slope is the rate of change of dispersion with respect to wavelength.

"Effective area" is defined as: $A_{eff}=2\pi(\int f^2 r \, dr)^2/(\int f^4 r \, dr)$, where the integration limits are 0 to $\infty$, and f is the transverse component of the electric field associated with light propagated in the waveguide. As used herein, "effective area" or "$A_{eff}$" refers to optical effective area at a wavelength of 1550 nm unless otherwise noted.

The term "α-profile" refers to a relative refractive index profile, expressed in terms of Δ(r) which is in units of "%", where r is the radius, which follows the equation, $\Delta(r)= \Delta(r_o)(1-[|r-r_o|/(r_i-r_o)]^\alpha)$ where $r_o$ is the point at which Δ(r) is maximum, $r_i$ is the point at which Δ(r)% is zero, and r is in the range $r_i \leq r \leq r_f$, where Δ is defined above, $r_i$ is the initial point of the α-profile, $r_f$ is the final point of the α-profile, and α is an exponent which is a real number.

The mode field diameter (MFD) is measured using the Peterman II method wherein, 2w=MFD, and $w^2= (2\int f^2 r \, dr/\int [df/dr]^2 r \, dr)$, the integral limits being 0 to $\infty$.

The bend resistance of a waveguide fiber can be gauged by induced attenuation under prescribed test conditions.

One type of bend test is the lateral load microbend test. In this so-called "lateral load" test, a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied to the plates and the increase in attenuation in dB/m is measured. The increase in attenuation is the lateral load attenuation of the waveguide.

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, N.Y. 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The effective fiber cutoff is lower than the theoretical cutoff due to losses that are induced by bending and/or mechanical pressure. In this context, the cutoff refers to the higher of the LP11 and LP02 modes. LP11 and LP02 are generally not distinguished in measurements, but both are evident as steps in the spectral measurement (when using the multimode reference technique), i.e. no power is observed in the mode at wavelengths longer than the measured cutoff. The actual fiber cutoff can be measured by the standard 2 m fiber cutoff test, FOTP-80 (EIA-TIA-455-80), to yield the "fiber cutoff wavelength", also known as the "2m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cabled cutoff" is even lower than the measured fiber cutoff due to higher levels of bending and mechanical pressure in the cable environment. The actual cabled condition can be approximated by the cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards, more commonly known as FOTP's. Cabled cutoff measurement is described in EIA-455-170 Cable Cutoff Wavelength of Single-mode Fiber by Transmitted Power, or "FOTP-170".

Bandwidth can be measured by using the TIA/EIA Standard described in TIA/EIA-455-204 "Measurement of Bandwidth on Multimode Fiber", or "FOTP-204", or by using the TIA/EIA Standard described in TIA/EIA-455-220 "Differential Mode Delay Measurement of Multimode Fiber in the Time Domain", or "FOTP-220", as appropriate.

Unless otherwise noted herein, optical properties (such as dispersion, dispersion slope, etc.) are reported for the LP01 mode.

A waveguide fiber telecommunications link, or simply a link, is made up of a transmitter of light signals, a receiver of light signals, and a length of waveguide fiber or fibers having respective ends optically connected to the transmitter and receiver to propagate light signals therebetween. The length of waveguide fiber can be made up of a plurality of shorter lengths that are spliced or connected together in end to end series arrangement. A link can include additional optical components such as optical amplifiers, optical attenuators, optical isolators, optical switches, optical filters, or multiplexing or demultiplexing devices. One may denote a group of inter-connected links as a telecommunications system.

A span of optical fiber as used herein includes a length of optical fiber, or a plurality of optical fibers fused together serially, extending between optical devices, for example between two optical amplifiers, or between a multiplexing device and an optical amplifier. A span may comprise one or more sections of optical fiber as disclosed herein, and may further comprise one or more sections of other optical fiber, for example as selected to achieve a desired system performance or parameter such as residual dispersion at the end of a span.

Embodiment(s) of the Invention

Figure 1B:
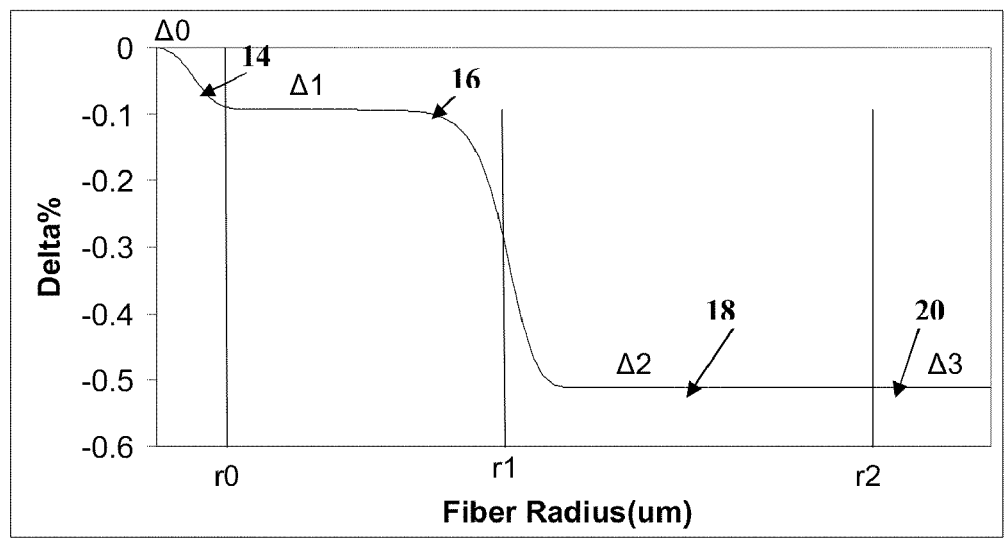
FIGS. 1B illustrates schematically an exemplary refractive index profile of the fiber of FIG. 1A.
Figure 2:
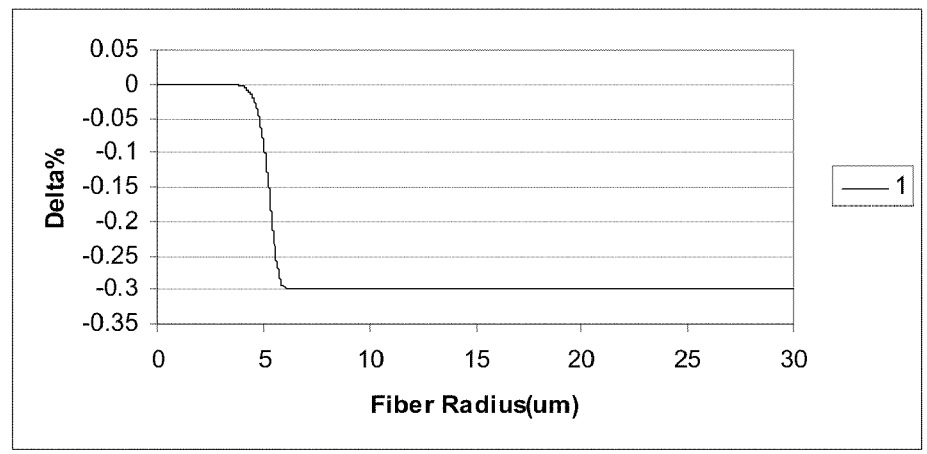
FIGS. 2-16 illustrate refractive index profiles of exemplary embodiments of the optical fibers of the present invention.
Figure 3:
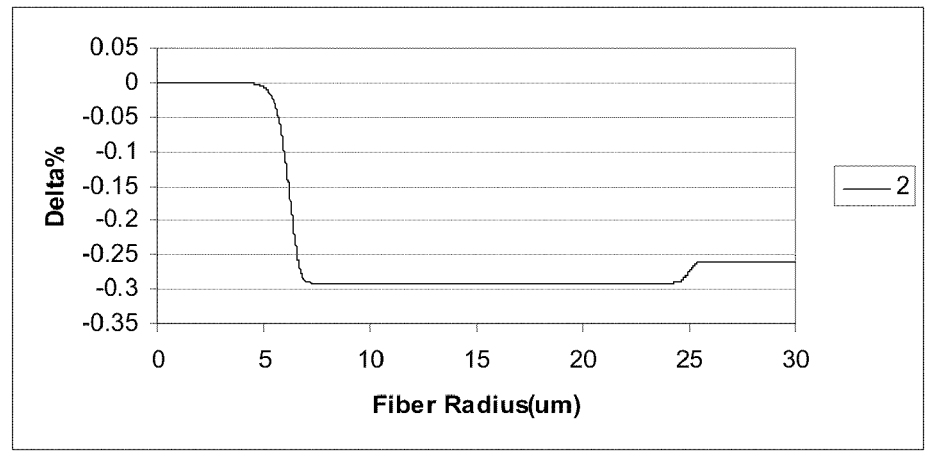
Figure 4:
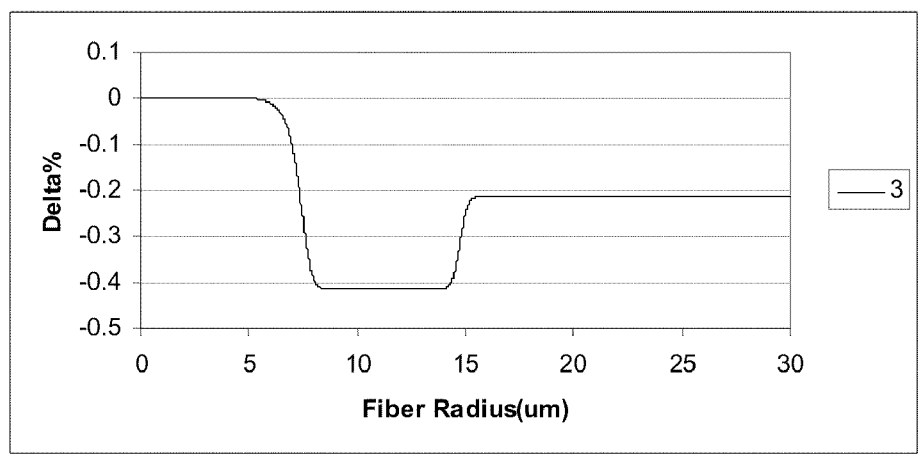
Figure 5:
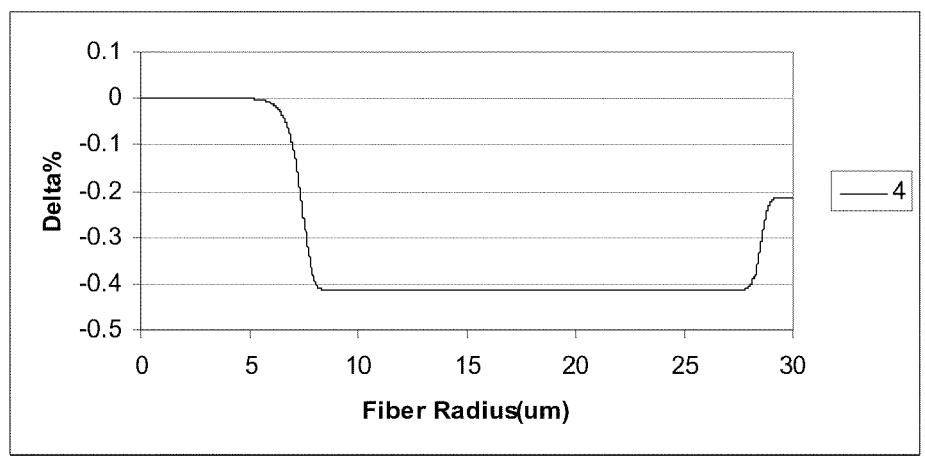
Figure 6:
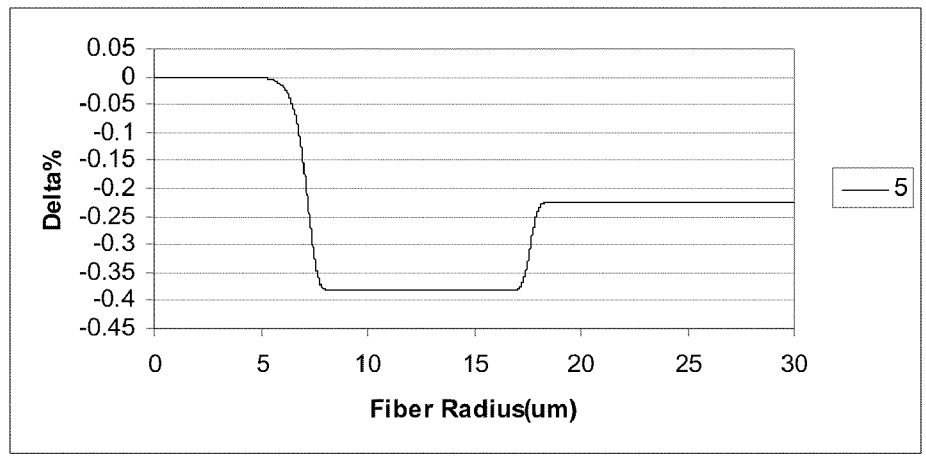
Figure 7:
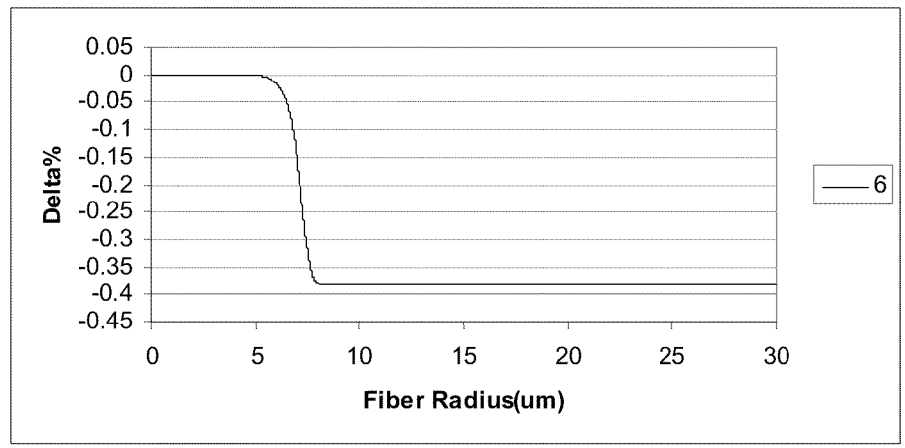
Figure 8:
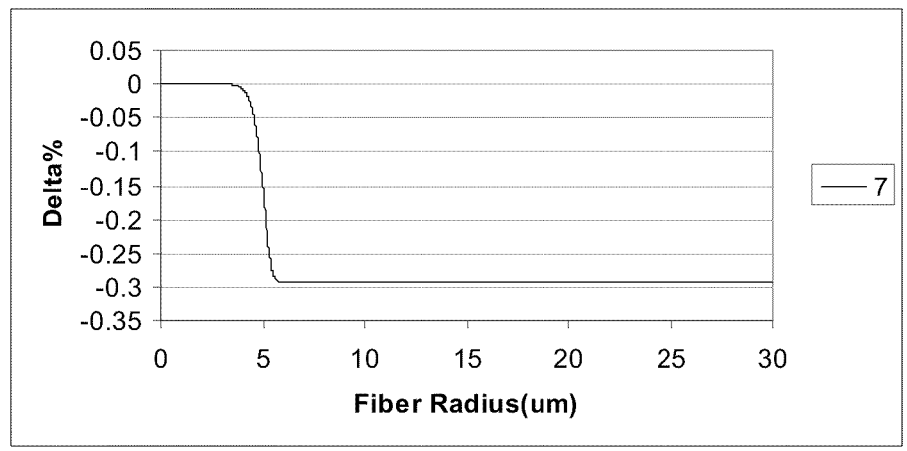
Figure 9:
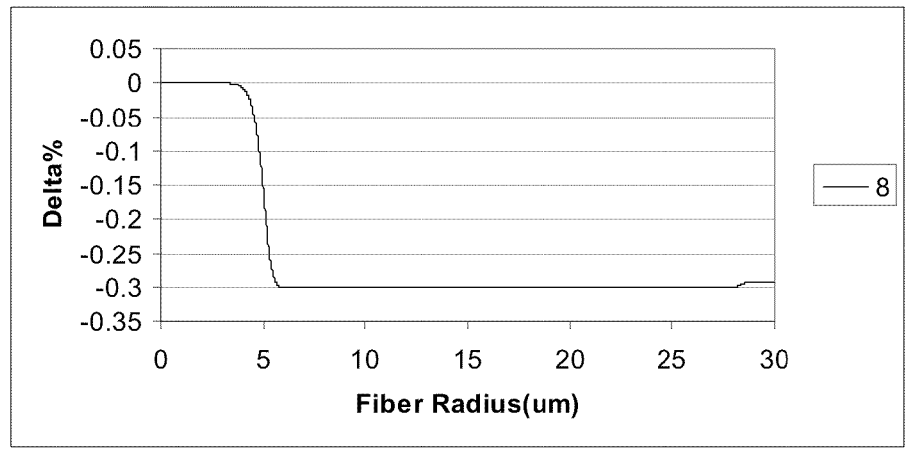
Figure 10:
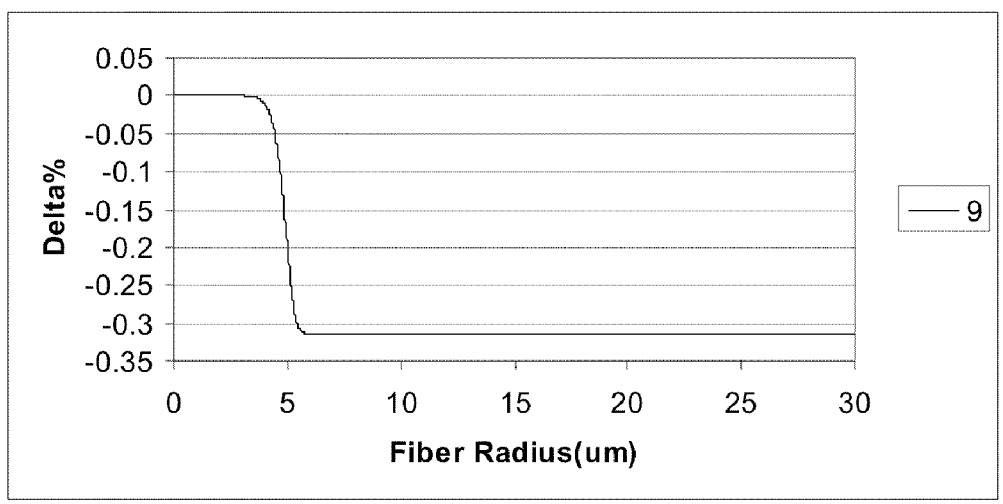
Figure 11:
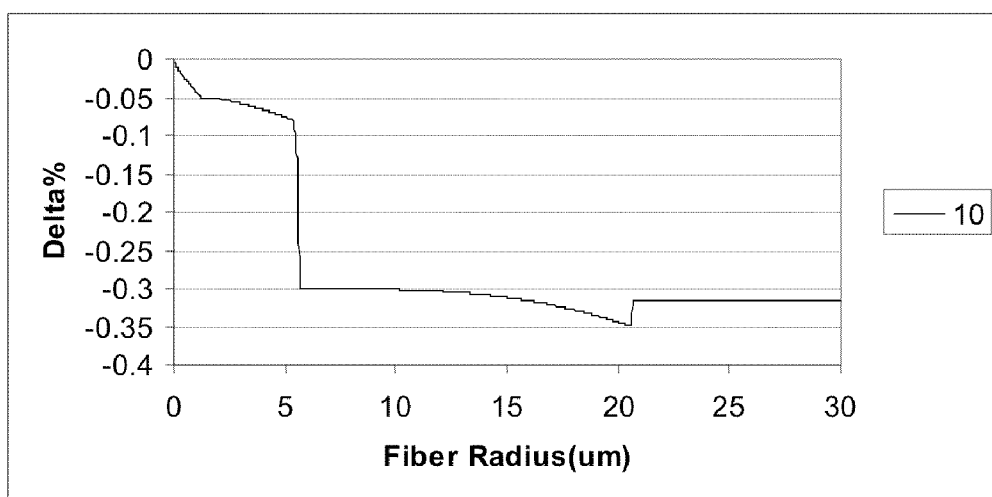
Figure 12:
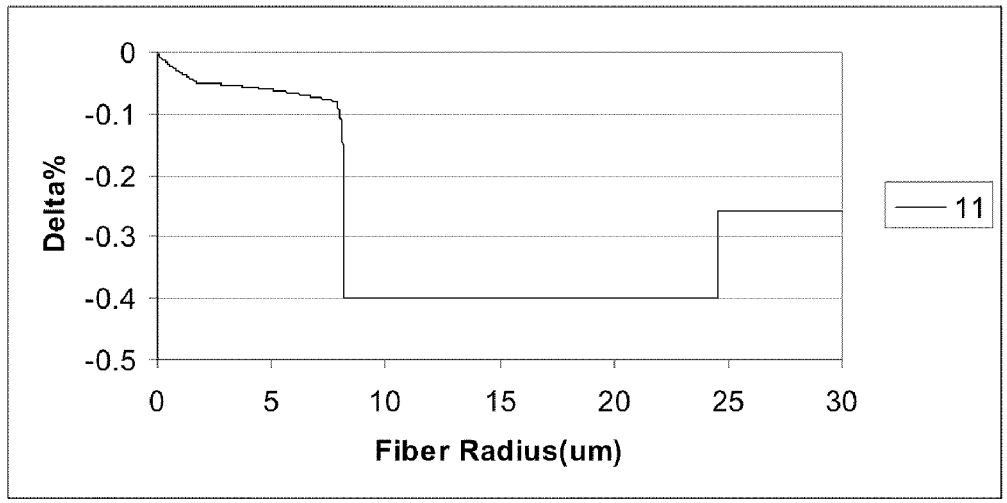
Figure 13:
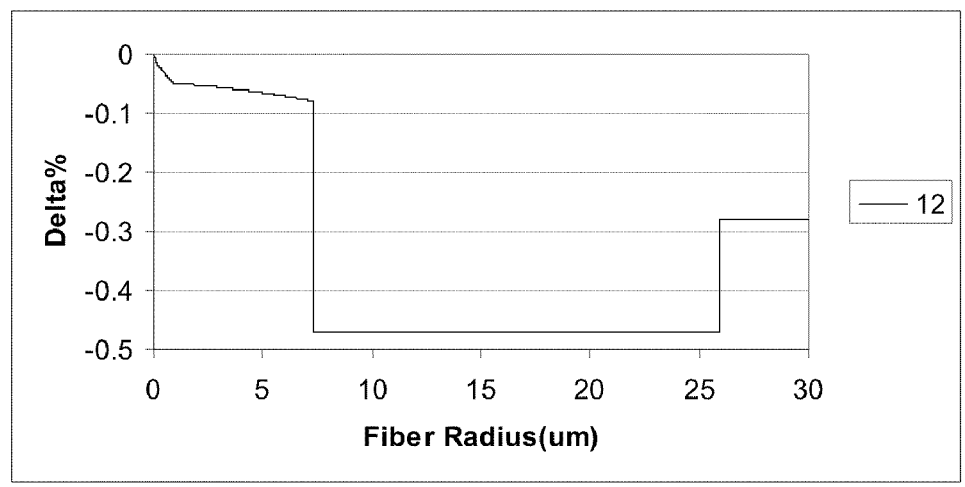
Figure 14:
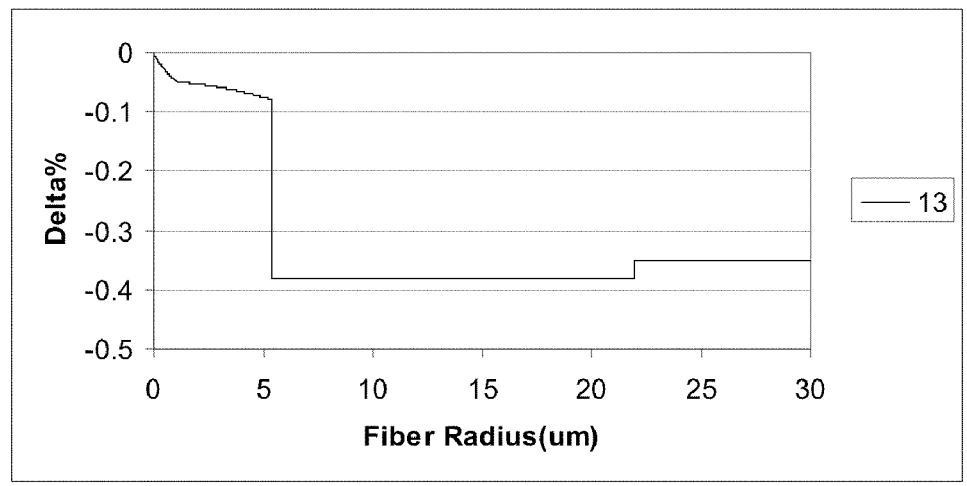
Figure 15:
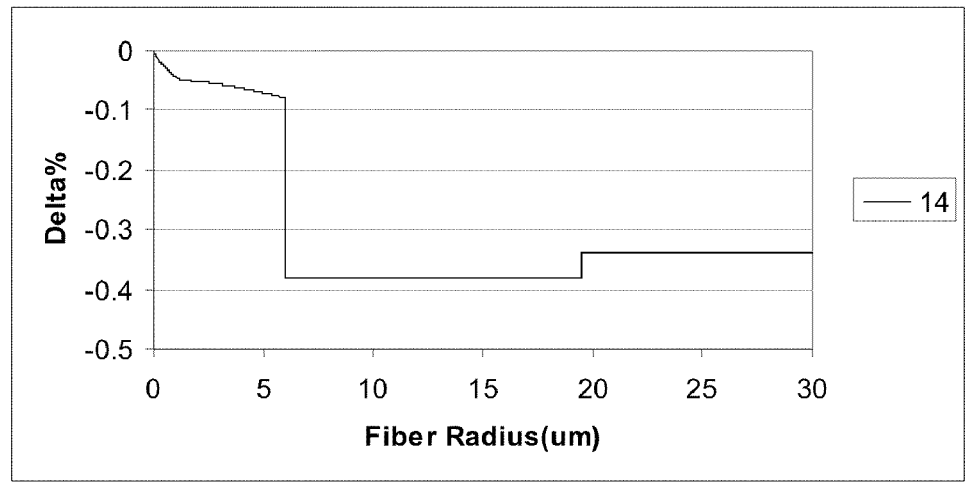
Figure 16:
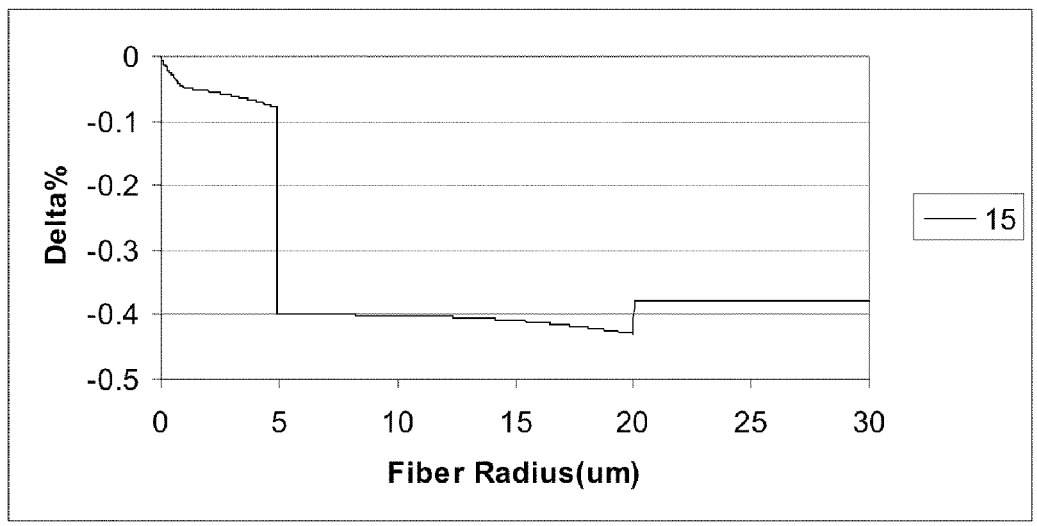

Reference will now be made in detail to the present embodiment(s) of the invention, examples of which are illustrated in the accompanying drawings. Whenever possible, the same reference numerals will be used throughout the drawings to refer to the same or like parts. One embodiment of the optical fiber of the present invention is shown in FIG. 1A, and is designated generally throughout by the reference numeral 10. The waveguide fiber 10 includes a core 12 having an effective area of at about 90 μm² or more at a 1550 nm wavelength (for example 90 μm² to 160 μm², or 100 μm² to 160 μm² at a 1550 nm wavelength), and α value $12 \leq \alpha \leq 25$, and a cladding 20 surrounding the core. A typical range of α values is 14 to 20, for example $15 \leq \alpha \leq 17$. The exemplary refractive index profile (relative refractive index delta, vs. radius) of this fiber shown schematically in FIG. 1B.

The core 12 is Ge free and comprises a central core region 14, a first annular core region 16 surrounding and directly adjacent to the central core region 14, and a second annular region 18 surrounding and directly adjacent to the first annular region 16. The a central core region 14 extends radially outwardly from a centerline to a radius 0 μm $\leq r_0 \leq 2$ μm, and has a relative refractive index percent profile $\Delta_0(r)$ measured in % relative to pure silica, wherein $-0.1\% \leq \Delta_0(r) \leq 0.1$. In some embodiments, $-0.1\% \leq \Delta_0(r) \leq 0\%$. For example, in some embodiments, $-0.075\% \leq \Delta_0(r) \leq 0\%$. The central core region 14 also has a maximum relative refractive index percent, $\Delta_{0MAX}$. In the exemplary embodiments described herein, $\Delta_{0MAX}$ occurs at the centerline of the fiber (r=0).

The first annular core region 16 extends to an outer radius $r_1$, wherein 4.8 μm $\leq r_1 \leq 10$ μm, and having a relative refractive index percent profile, $\Delta_i(r)$ in % measured relative to pure silica, and a minimum relative refractive index, $\Delta_{1MIN}$, a maximum relative refractive index $\Delta_{1MAX}$, (where $\Delta_{0MAX} \geq \Delta_{1MAX}$), and the relative refractive index $\Delta_1$ measured at a radius r=2.5 μm being: (a) $-0.15 \leq \Delta_1(r=2.5 \mu m) \leq 0$, and (b) $\Delta_{0MAX} \leq \Delta_1(r=2.5 \mu m)$. In some embodiments $\Delta_{1MAX} = \Delta_1(r=2.5 \mu m)$.

The second annular core region 18 is fluorine doped, and it surrounds and is directly adjacent to the first annular region 16. Typically, according to the embodiments described herein, second annular core region 18 has 0.01% to 1.6 wt % fluorine.

The second annular core region 18 extends to a radius 13 μm $\leq r_2 \leq 30$ μm and has a negative relative refractive index percent profile, $\Delta_2(r)$ in %, measured relative to pure silica, with a minimum relative refractive index $\Delta_{2MIN}$ being: (a) $\Delta_{2MIN} >_1(r=2.5 \mu m)$ and/or $\Delta_{2MIN} < \Delta_{1MAX}$, and (b) $-0.7\% \leq \Delta_{2MIN} \leq -0.28\%$. In some embodiments $-0.5\% < \Delta_{2MIN} < -0.275\%$. For example, $\Delta_{2MIN}$ may be $-0.29\%$, $-0.3\%$, $-0.35\%$, $-0.38\%$. For example, $\Delta_{2MIN}$ may be $-0.29\%$, $-0.3\%$, $-0.35\%$, $-0.38\%$, $-0.4\%$, $-0.47\%$, $-0.5\%$, or any number there between.

It is noted that the radius $r_1$ is defined to correspond to the mid point value between $\Delta_1(r=2.5 \mu m)$ and $\Delta_{2MIN}$. That is $r_i$=is a radius at which the $\Delta(r)=[\Delta_1(r=2.5 \mu m)+\Delta_{2MIN}]/2$.

Similarly, the radius $r_2$ is defined to correspond to the mid point value between $\Delta_{2MIN}$ and $\Delta_3$, that is $r_2$=is a radius at which the $\Delta(r)=[\Delta_{2MIN}+\Delta_3]/2$. In some embodiments the ratio $r_2/r_1$ is between 2 and 6. Preferably the ratio $2.1 \leq r_2/r_1 \leq 5.75$, for example $2.15 \leq r_2/r_1 \leq 5.7$. Preferably $r_2 \leq 30$ μm, for example 14 μm $\leq r_2 \leq 29$ μm. For a given $\Delta_2$ and $\Delta_3$, if the ratio $r_2/r_1$ is small (e.g., because $r_1$ is large), MFD becomes large, $\lambda_0$ becomes small, and dispersion D at 1550 nm becomes large. If the $r_2/r_1$ ratio is too large, MFD can become too small, $\lambda_0$ moves to higher wavelengths, and dispersion D at 1550 nm can become small.

The cladding 20 surrounds the core 12 and has a relative refractive index percent, $\Delta_0(r)$ in %, measured relative to pure silica, and $\Delta_c(r) = \Delta_{2MIN} \pm 0.3\%$.

In some exemplary embodiments the core 12 and the cladding 20, include F1 as a downdopant. In these embodiments the F1 in amount present in the first and second annular core regions 16 and 18 is greater than the amount of fluorine present in the central core region 14. In some exemplary embodiments the core 12 also includes at least one alkali metal oxide dopant, for example, K, Na, Li, Cs, and, Rb. In some exemplary embodiments the core 12 contains $K_2O$ in the amounts of 20 ppm to 1000 ppm by weight. Fiber 10 may also include chlorine. It is preferable that the amount of chlorine is greater than 500 ppm by wt in the core 12, and greater than 10000 ppm by wt in the cladding 20. It is noted that the term "ppm", unless otherwise specially noted otherwise, refers to parts per million by weight, or ppm by weight, and a measurement on wt % can be converted to ppm by multiplying by a factor of 10,000.

The relative refractive index profile of the optical fiber 10 is selected to provide attenuation of no more than 0.175 dB/km at the wavelength λ of 1550 nm, for example 0.145 dB/km to 0.175 dB/km at the wavelength λ of 1550 nm. The attenuation values can be, for example, are 0.15 dB/km, 0.155 dB/km, 0.16 dB/km, 0.165 dB/km, 0.165 dB/km, or 0.17 dB/km at the wavelength λ of 1550 nm.

EXAMPLES

The invention will be further clarified by the following examples.

Tables 1-2 list characteristics of Examples 1-15 of an illustrative set of fiber embodiments. FIGS. 2-16 show the refractive index profiles corresponding to Examples 1-15, respectively. In the optical fiber embodiments of Examples 1-15, $\Delta_0=0$; $-0.065\% \leq \Delta_i(r=2.5 \mu m) \leq 0\%$, $-0.065\% \leq \Delta_{1MAX} \leq 0.\%$, $-0.5\% \leq \Delta_{2MIN} \leq -0.275\%$, $-0.4\% \leq \Delta_3 \leq -0.2\%$, and $r_2/r_1$ is $2.17 \leq r_2/r_1 \leq 5.7$ and $r_2<30$. However, it is noted that in other embodiments $\Delta_0$ may be somewhat larger or smaller than 0% (relative to silica), depending on whether updopants or downdopants are present in the center core region 14. Although some embodiments of the optical fibers 10 have alpha values between 12 and 25, optical fiber embodiments of Examples 1-9 have alpha values in the range of 13-15. Optical fiber embodiments of Examples 10-15 have alpha values of about 20.

The modeled profile parameters of these exemplary fibers are summarized in Table 1A. The values for $r_3$ correspond to the outer diameter of the cladding, and in these examples $r_3$ was 62.5 μm. In some exemplary fibers $\Delta_2(\%)=\Delta_3(\%)$. Thus, because in these embodiments there is no obvious index change between the annular core regions 16 and 18, the $r_2$ value is provided as being within a specified range.

TABLE 1

| Example | $\Delta_{0MAX}$ (%) | $r_0$ (μm) | $\Delta_1$ (%) | $r_1$ (μm) | $\Delta_2$ (%) | $r_2$ (μm) | $\Delta_3$ (%) | $r_2/r_1$ |
|---|---|---|---|---|---|---|---|---|
| 1  | 0 | 0    | 0.000  | 5.25 | −0.300 | 15-26 | −0.300 | 2.86-4.95 |
| 2  | 0 | 0    | 0.000  | 6.20 | −0.290 | 25    | −0.260 | 4.03 |
| 3  | 0 | 0    | 0.000  | 7.38 | −0.412 | 16    | −0.213 | 2.17 |
| 4  | 0 | 0    | 0.000  | 7.38 | −0.412 | 28    | −0.213 | 3.80 |
| 5  | 0 | 0    | 0.000  | 7.10 | −0.382 | 18    | −0.225 | 2.54 |
| 6  | 0 | 0    | 0.000  | 7.10 | −0.382 | 16-26 | −0.382 | 2.25-3.66 |
| 7  | 0 | 0    | 0.000  | 5.00 | −0.292 | 16-26 | −0.292 | 3.20-5.20 |
| 8  | 0 | 0    | 0.000  | 5.00 | −0.302 | 28.5  | −0.292 | 5.70 |
| 9  | 0 | 0    | 0.000  | 4.90 | −0.315 | 16-26 | −0.315 | 3.26-5.31 |
| 10 | 0 | 1.40 | −0.064 | 5.63 | −0.301 | 20.5  | −0.315 | 3.64 |
| 11 | 0 | 1.92 | −0.062 | 8.15 | −0.400 | 24.8  | −0.260 | 3.04 |
| 12 | 0 | 1.12 | −0.062 | 7.40 | −0.470 | 26    | −0.280 | 3.51 |
| 13 | 0 | 1.30 | −0.062 | 5.60 | −0.380 | 22    | −0.350 | 3.93 |
| 14 | 0 | 1.40 | −0.063 | 6.20 | −0.380 | 19.6  | −0.340 | 3.16 |
| 15 | 0 | 1.00 | −0.061 | 5.00 | −0.401 | 20    | −0.380 | 4.00 |

In these 15 exemplary embodiments the cores 12 are silica based ($SiO_2$), and are doped with fluorine. The following table provide fluorine amounts (in wt %) for the core regions 16, 18 and in the cladding 20.

TABLE 2

| Example | Fl Wt % in core region 16 | Fl Wt % in core region 18 | Fl Wt % in core region 20 |
|---|---|---|---|
| 1  | 0.00  | −1.00 | −1.00 |
| 2  | 0.00  | −0.97 | −0.87 |
| 3  | 0.00  | −1.37 | −0.71 |
| 4  | 0.00  | −1.37 | −0.71 |
| 5  | 0.00  | −1.27 | −0.75 |
| 6  | 0.00  | −1.27 | −1.27 |
| 7  | 0.00  | −0.97 | −0.97 |
| 8  | 0.00  | −1.01 | −0.97 |
| 9  | 0.00  | −1.05 | −1.05 |
| 10 | −0.21 | −1.00 | −1.05 |
| 11 | −0.21 | −1.33 | −0.87 |
| 12 | −0.21 | −1.57 | −0.93 |
| 13 | −0.21 | −1.27 | −1.17 |
| 14 | −0.21 | −1.27 | −1.13 |
| 15 | −0.20 | −1.34 | −1.27 |

Please note that in the optical fiber embodiments corresponding to Examples 1-9 of Table 1, $\Delta_0(\%)=\Delta_1(\%)$, and the composition of the central core region 14 and the first annular region 16 (up to the elbow section on the graph associated with the transition to the second annular region 18) are identical (see FIGS. 2-10). Thus, because in Examples 1-9, there is no clear transition between core regions 14 and 16, although Table 1 specifies that $r_0$ is 0 μm, we could have also specified that $r_0=2$ μm. In these exemplary fibers the $\Delta_{0MAX}$ is 0, because the core region 14 (and at least a portion of the first annular region 16) is pure silica.

More specifically, the optical fiber embodiments corresponding to the Examples 2-5 of Table 1 (see FIGS. 3-6) include of a core refractive index profile with a central segment 14 surrounded by the first annular core region 16 having a refractive index $\Delta_0=\Delta_1$, which in turn is surrounded by a moat region corresponding to the second annular core region 18 with refractive index $\Delta_{2MIN}$. This moat (second annular core region 18) is surrounded by the cladding 20 having refractive index $\Delta_3>\Delta_{2MIN}$. In the optical fiber embodiments corresponding to the Examples 1-5, $-0.3\% \leq \Delta_3 \leq -0.213\%$.

The optical fiber embodiments corresponding to the Examples 6-9 of Table 1 include a core refractive index profile with a pure silica central core region 14 surrounded by the first (pure silica) annular core region 16 having a relative refractive index $\Delta_0=\Delta_1=0$. In these exemplary fibers the first annular core region 16 is surrounded by the second annular core region 18 with a relative refractive index $\Delta_2<\Delta_1$. The second annular core region 18 with a relative refractive index $\Delta_2$, is surrounded by a cladding 20 having refractive index $\Delta_3=\Delta_2$. In the optical fiber embodiments corresponding to Examples 6, 7 and 9 the compositions of second annular core region 18 and the cladding 20 are identical. However, in other embodiments (see for example the optical fiber parameters of Example 9) the compositions of the second annular region 18 and the cladding 20 may not be identical. In the optical fiber embodiments corresponding to the Examples 6-9, $-0.382\% \leq \Delta_3 \leq -0.315\%$. The optical fiber embodiments corresponding to the Examples 10-15 of Table 1 (see FIGS. 11-16) include of a core refractive index profile with a pure silica central core region 14 having a relative refractive index $\Delta_{0MAX}=0$ surrounded by the first annular core region 16. The first annular region 16 has a relative refractive index $-0.1\%<\Delta_1 \leq 0\%$, and is surrounded by a moat region corresponding to the second annular core region 18 with refractive index $\Delta_{2MIN}$. In optical fiber embodiments corresponding to Examples 10-15 the second annular core region 18, $-0.5\% \leq \Delta_{2MIN} \leq -0.275\%$, for example $\Delta_{2MIN}$ may be −0.29, −0.3, −0.35, −0.38, −0.4, −0.47, or any number therebetween. The moat (second annular core region 16) is surrounded by a third annular core region 18 having refractive index $\Delta_3>\Delta_2$. In the optical fiber embodiments corresponding to the Examples 10-15, $-0.38\% \leq \Delta_3 \leq -0.26\%$.

Some of the embodiments of the optical fibers have the following modeled values: fiber cut-of wavelength λc between 1321 nm and 1580 nm, Effective Area at 1550 nm between 90 μm² ≤ $A_{eff}$ ≤ 160 μm², dispersion D at 1550 nm between 18 ps/nm/km, and 25 ps/nm/km, and more preferably between 19 ps/nm/km and 23.5 ps/nm/km., and Attenuation at 1550 nm less than 175 dB/km, for example between 0.165 dB/km and 0.175 dB/km. The exemplary fibers of Table 1 have been modeled and the modeled optical attributes are listed in Tables 2A and 2B.

TABLE 2A

| Example | 1 | 2 | 3 | 4 | 5 | 6 | 7 | 8 |
|---|---|---|---|---|---|---|---|---|
| D1310 | 2.91 | 3.87 | 5.17 | 5.19 | 4.99 | 4.99 | 2.32 | 2.49 |
| Slope 1310 | 0.0869 | 0.0888 | 0.0908 | 0.0909 | 0.0906 | 0.0906 | 0.0862 | 0.0862 |
| MFD 1310 | 10.35 | 11.27 | 11.71 | 11.71 | 11.60 | 11.60 | 10.21 | 10.13 |
| D 1550 | 19.87 | 21.24 | 22.99 | 23.07 | 22.77 | 22.78 | 19.13 | 19.30 |
| slope 1550 | 0.0591 | 0.0607 | 0.0622 | 0.0627 | 0.0622 | 0.0623 | 0.0585 | 0.0586 |
| LP11 | 1498 | 1497 | 1388 | 1387 | 1411 | 1411 | 1402 | 1352 |
| LP02 | 948 | 927 | 896 | 896 | 906 | 906 | 888 | 832 |
| PinArray | 8.43 | 11.49 | 30.29 | 10.56 | 20.08 | 9.25 | 16.56 | 15.94 |
| LatLoad | 1.13 | 2.55 | 7.17 | 2.72 | 4.58 | 2.25 | 1.61 | 1.28 |
| Aeff 1310 | 86.37 | 105.12 | 120.06 | 120.05 | 116.66 | 116.66 | 83.02 | 81.93 |
| Aeff 1550 | 103.75 | 122.02 | 132.33 | 132.23 | 129.54 | 129.52 | 101.71 | 99.76 |
| MFD 1550 | 11.52 | 12.33 | 12.45 | 12.44 | 12.39 | 12.39 | 11.48 | 11.35 |
| D 1625 | 24.13 | 25.62 | 27.48 | 27.59 | 27.26 | 27.28 | 23.35 | 23.53 |
| Attn 1550 | 0.170 | 0.169 | 0.167 | 0.167 | 0.168 | 0.168 | 0.170 | 0.170 |
| Fiber cutoff wavelength $\lambda_c$ | 1538 | 1537 | 1428 | 1427 | 1451 | 1451 | 1442 | 1392 |
| Lambda0 ($\lambda_0$) | 1276.5 | 1266.5 | 1253.1 | 1253.0 | 1254.9 | 1254.9 | 1283.0 | 1281.2 |

TABLE 2B

| Example | 9 | 10 | 11 | 12 | 13 | 14 | 15 |
|---|---|---|---|---|---|---|---|
| D1310 | 2.42 | 2.84 | 5.05 | 5.38 | 3.57 | 4.21 | 3.05 |
| Slope 1310 | 0.0860 | 0.0873 | 0.0910 | 0.0906 | 0.0870 | 0.0883 | 0.0858 |
| MFD 1310 | 9.91 | 11.17 | 12.81 | 11.64 | 10.22 | 10.78 | 9.64 |
| D 1550 | 19.16 | 19.95 | 22.98 | 23.20 | 20.55 | 21.49 | 19.76 |
| Slope 1550 | 0.0583 | 0.0600 | 0.0629 | 0.0625 | 0.0591 | 0.0603 | 0.0581 |
| LP11 | 1281 | 1526 | 1536 | 1424 | 1403 | 1506 | 1373 |
| LP02 | 793 | 991 | 1006 | 932 | 880 | 947 | 857 |
| PinArray | 18.99 | 20.13 | 14.63 | 9.35 | 8.17 | 5.70 | 5.67 |
| LatLoad | 1.14 | 4.75 | 25.59 | 2.52 | 0.77 | 0.96 | 0.42 |
| Aeff 1310 | 78.43 | 99.03 | 141.02 | 117.86 | 84.89 | 96.06 | 74.89 |
| Aeff 1550 | 95.55 | 120.80 | 156.69 | 130.26 | 100.42 | 111.21 | 89.86 |
| MFD 1550 | 11.11 | 12.50 | 13.62 | 12.37 | 11.28 | 11.76 | 10.72 |
| D 1625 | 23.37 | 24.29 | 27.53 | 27.71 | 24.81 | 25.84 | 23.96 |
| Attn 1550 | 0.170 | 0.173 | 0.171 | 0.171 | 0.173 | 0.172 | 0.174 |
| Fiber Cutoff wavelength $\lambda_c$ | 1321 | 1566 | 1576 | 1464 | 1443 | 1546 | 1413 |
| Lambda0 ($\lambda_0$) | 1281.9 | 1277.4 | 1254.5 | 1250.6 | 1268.9 | 1262.3 | 1274.4 |

In Tables 2A and 2B, the terms "Slope 1310" and "Slope 1550" stand for the dispersion slope at 1310 nm and 1550 nm wavelength, respectively; "MFD 1310" and "MFD 1550" stand for mode field diameters at 1310 nm 1550 nm wavelength, respectively; "Aeff 1310" and "Aeff 1550" stand for the effective area of the fiber, at 1310 nm and 1550 nm wavelength, respectively; "D 1625" stands for dispersion at 1625 nm wavelength, "Attn 1550" stands for attenuation at 1550 nm, and the term "Lambda 0" or "$\lambda_0$" stands for zero dispersion wavelength.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An optical waveguide fiber comprising:
   (i) a Ge free core having an effective area of 90 µm² to 160 µm², at the 1550 nm wavelength, and α value 12≦α≦25, said core comprising:
   (a) a central core region extending radially outwardly from a centerline to a radius 0 µm ≦$r_0$≦2 µm, and having a relative refractive index percent profile $\Delta_0(r)$ wherein −0.1% ≦$\Delta_0(r)$ ≦0.1%, wherein the central core region has a maximum relative refractive index, $\Delta_{0MAX}$;
   (b) a first annular core region surrounding and directly adjacent to the central core region and extending to an outer radius $r_1$, wherein 4.8 µm ≦$r_1$≦10 µm, and having a relative refractive index percent profile, $\Delta_1(r)$ and a minimum relative refractive index, $\Delta_{2MIN}$, and the relative refractive index measured at a radius r=2.5 µm being:

−0.15≦$\Delta_1$(r=2.5 µm)≦0 and $\Delta_{0MAX}$≧$\Delta_1$(r=2.5 µm);

(c) a fluorine doped second annular region surrounding and directly adjacent to the first annular core region and extending to a radius 13 µm ≦$r_2$≦30 µm and having a negative relative refractive index percent profile, $\Delta_2(r)$, with a minimum relative refractive index $\Delta_{2MIN}$ being:

$\Delta_{2MIN}$<$\Delta_1$(r=2.5 µm) and −0.7% ≦$\Delta_{2MIN}$≦−0.28%;

(ii) a cladding surrounding the core and having a relative refractive index percent $\Delta_c$ (r), and $\Delta_c$ (r)=$\Delta_{2MIN}$±0.3%; wherein the relative refractive index profile of the optical fiber is selected to provide attenuation of no more than 0.175 dB/km at the 1550 nm wavelength.

2. The optical waveguide fiber according to claim 1 wherein at least a portion of the central core region is made of pure silica.

3. The optical waveguide fiber according to claim 1 wherein $-0.5\% < \Delta_{2MIN} < -0.25\%$.

4. The optical waveguide fiber according to claim 1, wherein $-0.1\% \leq \Delta_1(r=2.5) \leq 0\%$.

5. The optical waveguide fiber according to claim 1, wherein $\Delta_0=0$; $-0.07\% \leq \Delta_1(r=2.5\ \mu m) \leq 0\%$, $-0.5\% \leq \Delta_{2MIN} \leq -0.275\%$, $r_2/r_1$ is $2.17 \leq r_2/r_1 \leq 5.7$, and $r_2 \leq 2.6$.

6. The optical waveguide fiber according to claim 1, wherein said fiber is characterized by dispersion D at a wavelength of 1550 nm, and $18 \leq D \leq 25$ ps/nm/km.

7. The optical waveguide fiber according to claim 1, wherein said fiber is characterized by dispersion D at a wavelength of 1550 nm, and $19 \leq D \leq 23$ ps/nm/km.

8. The optical waveguide fiber according to claim 1, wherein said fiber is characterized by a zero dispersion wavelength $\lambda_0$, and $1245\ nm \leq \lambda_0 \leq 1290\ nm$.

9. The optical waveguide fiber according to claim 1, wherein said fiber has macrobend loss at 1550 nm of less than 1 dB/m for 20 turns on 20 mm diameter mandrel.

10. The optical waveguide fiber according to claim 1, wherein said fluorine doped second annular region has 0.01% wt % to 1.6 wt % fluorine.

11. The optical waveguide fiber according to claim 1, wherein: (i) said Ge free core has an effective area of 100 $\mu m^2$ to about 160 $\mu m^2$s; (ii) aid fluorine doped second annular region has 0.07% wt % to 1.6 wt % fluorine.

12. The optical waveguide fiber according to claim 1, wherein said fiber has more than 500 ppm of Chlorine in said core and more than 10000 ppm of chlorine in the cladding.

13. The optical waveguide fiber according to claim 1, wherein (i) said fluorine doped second annular region has 0.01% to 1.6 wt % fluorine and (iii) said fiber has more than 500 ppm of chlorine in the core and (iii) more than 10000 ppm of chlorine in the cladding.

14. An optical waveguide fiber comprising:
(i) a Ge free core having an effective area of 100 $\mu m^2$ to 160 $\mu m^2$, at the 1550 nm wavelength, and $\alpha$ value $12 \leq \alpha \leq 25$, said core comprising:
(a) a central core region extending radially outwardly from a centerline to a radius $r_0 \leq 2\ \mu m$, and having a relative refractive index percent profile $\Delta_0(r)$, wherein $-0.1\% \leq \Delta_0(r) \leq 0.1\%$, wherein the central core region has a maximum relative refractive index, $\Delta_{0MAX}$;
(b) a first annular core region surrounding and directly adjacent to the central core region and extending to an outer radius $r_1$, wherein $4.8\ \mu m \leq r_1 \leq 10\ \mu m$, and having a relative refractive index percent profile, $\Delta_1(r)$, and a minimum relative refractive index, $\Delta_{2MIN}$, and the relative refractive index measured at a radius $r=2.5\ \mu m$ being:

$-0.15 \leq \Delta_1(r=2.5\ \mu m) \leq 0$ and $\Delta_{0MAX} \leq \Delta_1(r=2.5\ \mu m)$;

(c) a fluorine doped second annular region surrounding and directly adjacent to the first annular core region and extending to a radius $13\ \mu m \leq r_2 \leq 30\ \mu m$ and having a negative relative refractive index percent profile, $\Delta_2(r)$, with a minimum relative refractive index $\Delta_{2MIN} < \Delta_1$ $(r=2.5\ \mu m)$ and $-0.7\% \leq \Delta_{2MIN} \leq -0.28\%$; and (ii) a cladding surrounding the core and having a relative refractive index percent $\Delta_c(r)$, and $\Delta_c(r) = \Delta_{2MIN} \pm 0.3\%$;
wherein the relative refractive index profile of the optical fiber is selected to provide attenuation of 0.15 dB/km to 0.175 dB/km at a the 1550 nm wavelength, wherein $\Delta_0=0$; $-0.07\% \% \leq \Delta_1(r=2.5\ \mu m) \leq 0\%$, $-0.5\% \leq \Delta_{2MIN} \leq -0.275\%$, $r_2/r_1$ is $2.17 \leq r_2/r_1 \leq 5.7$, and $r_2 \leq 2.6$, said optical waveguide fiber has dispersion D at a wavelength of 1550 nm is $18 \leq D \leq 25$ ps/nm/km, $1245\ nm \leq \lambda_0 \leq 1290\ nm$ and macrobend loss at 1550 nm of less than 1 dB/m for 20 turns on 20 mm diameter mandrel.

* * * * *